(12) United States Patent
Gibson et al.

(10) Patent No.: US 9,333,974 B1
(45) Date of Patent: May 10, 2016

(54) SYSTEM AND METHOD FOR IMPROVING DRIVELINE OPERATION

(71) Applicant: Ford Global Technologies, LLC, Dearborn, MI (US)

(72) Inventors: Alexander O'Connor Gibson, Ann Arbor, MI (US); Matthew John Shelton, Grosse Ile, MI (US); Kirk Pebley, Novi, MI (US); Hong Jiang, Birmingham, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/597,456

(22) Filed: Jan. 15, 2015

(51) Int. Cl.
| | |
|---|---|
| *F16H 61/48* | (2006.01) |
| *B60W 30/192* | (2012.01) |
| *B60W 10/02* | (2006.01) |
| *B60W 10/06* | (2006.01) |
| *B60W 10/11* | (2012.01) |

(52) U.S. Cl.
CPC .............. *B60W 30/192* (2013.01); *B60W 10/02* (2013.01); *B60W 10/026* (2013.01); *B60W 10/06* (2013.01); *B60W 10/11* (2013.01)

(58) Field of Classification Search
None
See application file for complete search history.

(56) References Cited

U.S. PATENT DOCUMENTS

| | | | | |
|---|---|---|---|---|
| 7,770,676 | B2* | 8/2010 | Tenbrock | B60K 6/48 180/65.1 |
| 7,908,069 | B2* | 3/2011 | Whitmer | F02B 37/11 477/175 |
| 8,047,959 | B2* | 11/2011 | Fuechtner | B60K 6/387 477/5 |
| 8,108,115 | B2* | 1/2012 | Kobayashi | F16H 61/143 192/3.28 |
| 8,192,327 | B2* | 6/2012 | Gibson | B60W 10/02 477/77 |

(Continued)

*Primary Examiner* — Dirk Wright
(74) *Attorney, Agent, or Firm* — Julia Voutyras; Alleman Hall McCoy Russell & Tuttle LLP

(57) ABSTRACT

Methods and systems for improving operation of a vehicle driveline that includes an engine and a driveline disconnect clutch that selectively couples the engine to a torque converter are presented. In one non-limiting example, a torque converter clutch is closed before the driveline disconnect clutch is opened so that output of a transmission pump may be maintained and so that torque converter impeller speed may be determined.

20 Claims, 4 Drawing Sheets

(56) References Cited

U.S. PATENT DOCUMENTS

| | | | |
|---|---|---|---|
| 8,292,012 B2 | 10/2012 | Sowul et al. | |
| 8,376,908 B2* | 2/2013 | Tsuzuki | B60W 10/02 477/181 |
| 8,652,002 B2* | 2/2014 | Otanez | F16H 61/0031 477/176 |
| 8,738,217 B2* | 5/2014 | Banker | B60W 20/00 701/29.1 |
| 8,758,200 B2 | 6/2014 | Dai et al. | |
| 8,795,135 B2* | 8/2014 | Lewis | F02N 11/0822 477/99 |
| 8,840,525 B2* | 9/2014 | Enoki | B60W 10/02 477/102 |
| 8,924,065 B2* | 12/2014 | Nakanishi | B60K 6/48 180/65.265 |
| 9,028,363 B2* | 5/2015 | Kobayashi | B60K 6/48 477/5 |
| 9,031,727 B2* | 5/2015 | Miyazaki | B60K 6/48 701/110 |
| 9,127,765 B2* | 9/2015 | Eto | B60K 6/48 |
| 9,132,834 B2* | 9/2015 | Ideshio | B60K 6/383 |
| 9,139,077 B2* | 9/2015 | Yoshikawa | B60W 10/02 |
| 9,156,468 B2* | 10/2015 | Ideshio | B60K 6/48 |
| 9,162,676 B2* | 10/2015 | Eto | B60K 6/48 |
| 2011/0098153 A1* | 4/2011 | Tsuzuki | B60W 10/02 477/168 |
| 2011/0295455 A1* | 12/2011 | Schenk | F16D 48/06 701/22 |
| 2014/0163787 A1* | 6/2014 | Gibson | B60W 20/40 701/22 |
| 2014/0163802 A1* | 6/2014 | Tokai | F16H 61/14 701/22 |
| 2014/0180522 A1* | 6/2014 | Ideshio | B60K 6/48 701/22 |
| 2014/0195089 A1* | 7/2014 | Kobayashi | F02N 11/006 701/22 |
| 2014/0249710 A1* | 9/2014 | Nakanishi | B60K 6/48 701/22 |
| 2014/0278018 A1* | 9/2014 | Gibson | F02D 41/022 701/112 |

* cited by examiner

SYSTEM AND METHOD FOR IMPROVING DRIVELINE OPERATION

BACKGROUND/SUMMARY

A driveline may include a disconnect clutch that is combined with a torque converter and located between an engine and the torque convertor to selectively couple the engine to the torque converter. The disconnect clutch may allow engine rotation to stop while a vehicle is moving without being powered from an adjustable torque source. For example, the engine may be stopped when the vehicle is coasting down a road having a negative grade. The torque converter dampens driveline torque and provides torque multiplication since the torque converter input (e.g., torque convertor impeller) may rotate at a different speed than the torque converter output (e.g., torque converter turbine). Thus, the output side of the disconnect clutch may rotate at a speed different than the transmission input shaft speed. The engine may be stopped to conserve fuel and reduce an amount of air pumped through an exhaust after treatment device coupled to the engine while the vehicle is moving. However, if the engine is restarted, it may be difficult to control closing of the driveline disconnect clutch because packaging constraints may not allow a speed sensor to be placed at the output side of the disconnect clutch. Consequently, it may be difficult to control torque flow through the disconnect clutch when the engine is being recoupled to the torque converter impeller.

The inventors herein have recognized the above-mentioned issues and have developed a method for operating a driveline, comprising: at least partially closing a torque converter clutch in response to a request to open a disconnect clutch, the torque converter clutch at least partially closed before opening the disconnect clutch; and accelerating an engine that has stopped rotating to a speed based on disconnect clutch output side speed.

By at least partially closing a torque converter clutch before opening a disconnect clutch, speed of an output side of a driveline disconnect clutch may be determined based on speed of a transmission shaft. In particular, closing the torque converter clutch may cause the torque converter impeller to rotate at a same speed as a torque converter turbine. The torque converter turbine rotates at a same speed as a transmission input shaft. Consequently, the driveline disconnect clutch output speed may be determined from the transmission input shaft speed which may be monitored via a speed sensor. Additionally, closing the torque converter clutch allows a transmission pump to be rotated via torque from the torque converter impeller. As a result, the transmission pump may supply pressure to operate transmission clutches even though the engine is not rotating the torque converter impeller which is mechanically coupled to the transmission pump.

The present description may provide several advantages. For example, the approach may reduce vehicle fuel consumption by allowing an engine to stop while a vehicle in which the engine operates is moving. Additionally, the approach may allow transmission shifting to maintain pump output pressure while an engine has stopped rotating. Further, the approach may extend vehicle coasting, thereby reducing fuel consumption.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
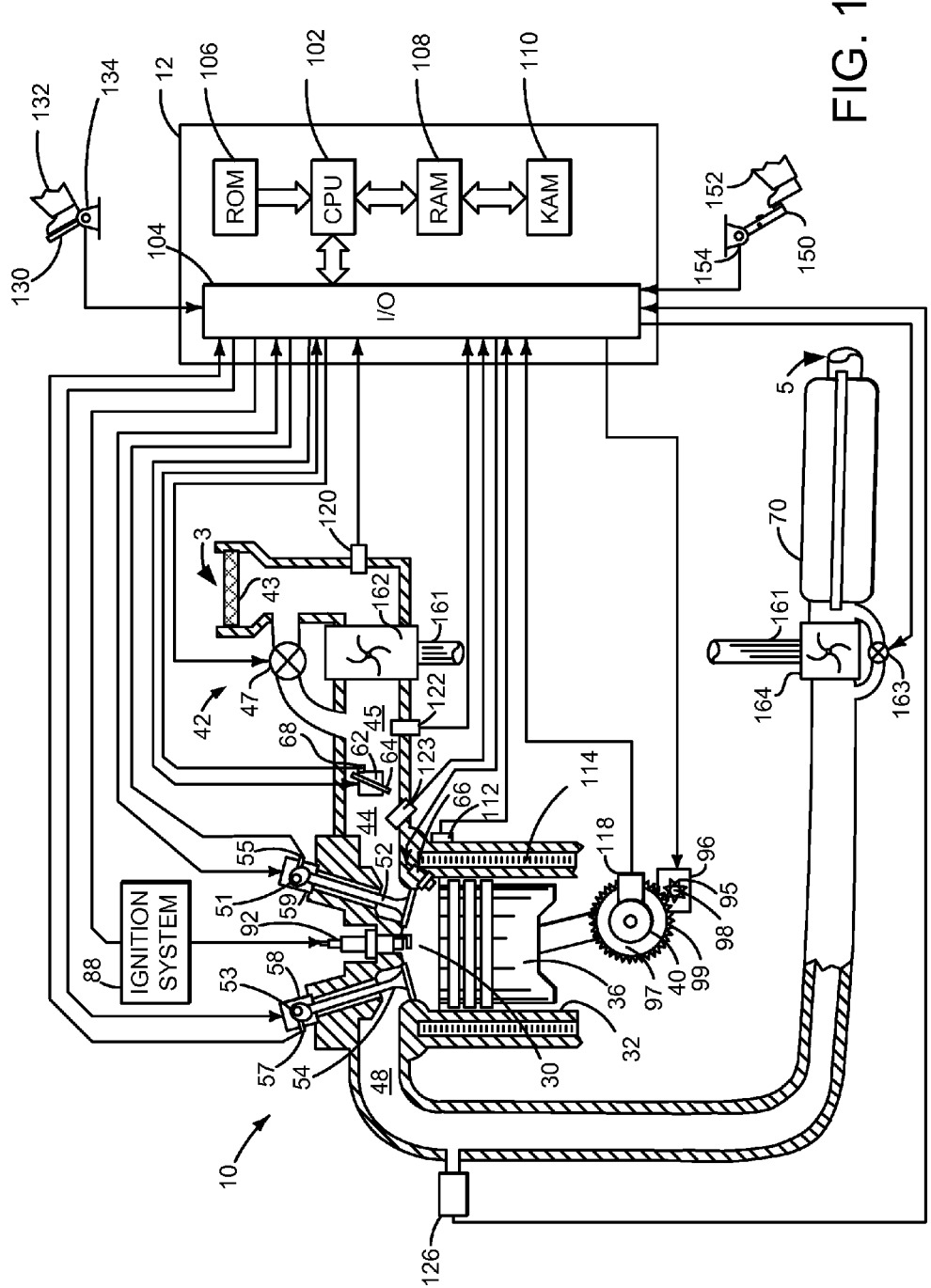
FIG. 1 shows a schematic depiction of an engine.
Figure 2:
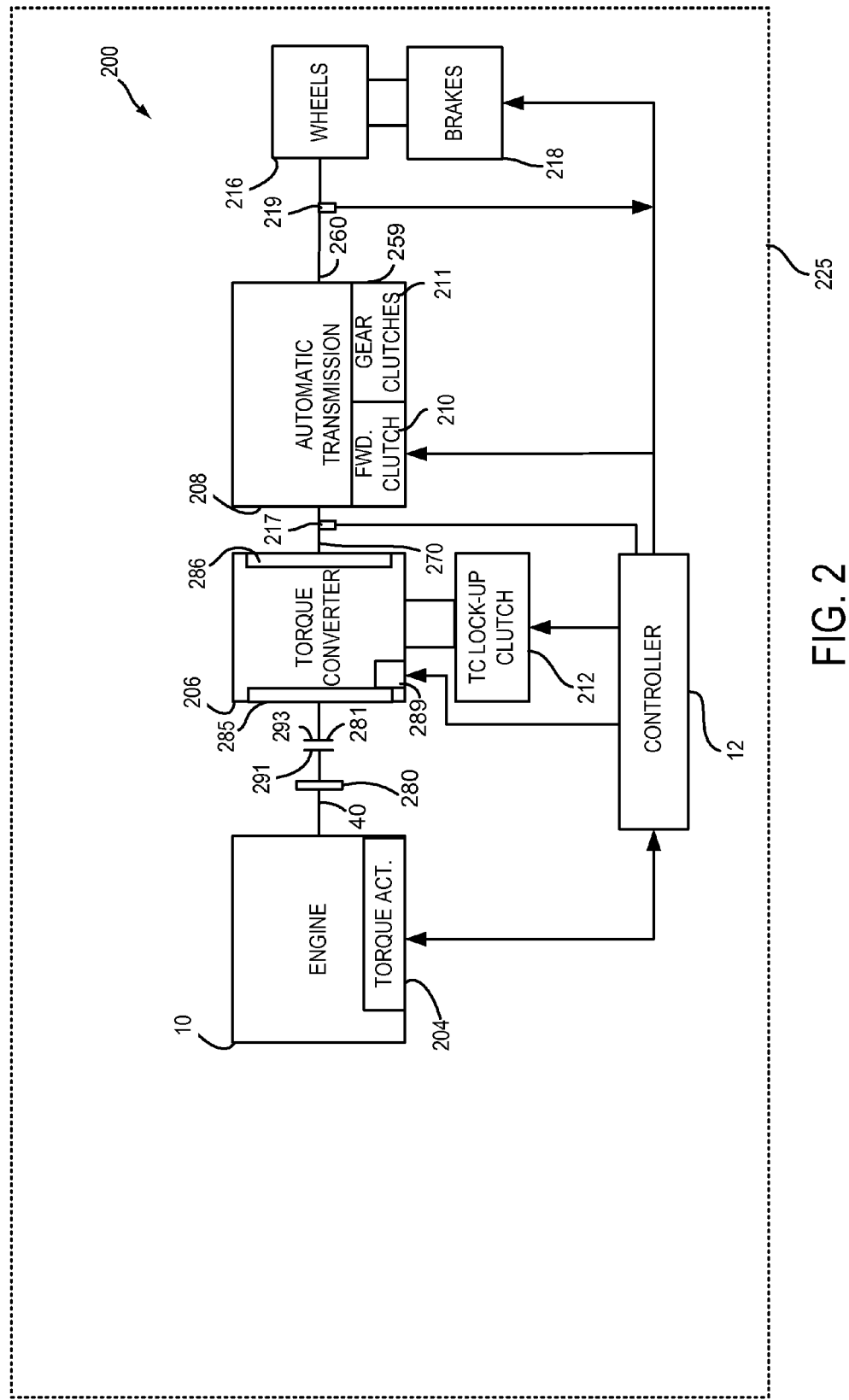
FIG. 2 shows a schematic depiction of an example vehicle driveline including an engine.

The present description is related to operating a vehicle driveline that includes a disconnect clutch that is positioned between an engine and a torque converter. The engine may be configured as is shown in FIG. 1. The engine of FIG. 1 may be incorporated into a vehicle driveline as shown in FIG. 2, and the engine may be the only adjustable torque source in the driveline as is shown in FIG. 2. The system of FIGS. 1 and 2 may include executable instructions to provide the driveline operating method described in FIG. 3. The vehicle driveline may operate as is shown in the operating sequence of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5 which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including:

microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a driveline 200. The driveline of FIG. 2 includes engine 10 shown in FIG. 1. Driveline 200 may be powered by engine 10. Engine crankshaft 40 is shown coupled to dampener 280, and dampener 280 is shown coupled to the input side 291 of disconnect clutch 281. The output side 293 of disconnect clutch 281 is coupled to impeller 285 of torque converter 206. Torque converter impeller is mechanically coupled to transmission pump 289. Transmission pump 289 supplies pressurized transmission fluid to transmission clutches 210 and 211. Torque converter 206 also includes a turbine 286 coupled to transmission input shaft 270. Transmission input shaft 270 mechanically couples torque converter 206 to automatic transmission 208 and its speed is monitored via speed sensor 217. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208.

Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., reverse and gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Speed of output shaft 260 is monitored via speed sensor 219. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Thus, in this example, engine 10 is the only adjustable torque source that may provide torque to driveline 200. Torque flows from engine 10 to disconnect clutch 281 and transmission 208 before being applied to wheels 216. Thus, engine 10 is upstream of disconnect clutch 280, torque converter 206, transmission 208, and wheels 216 in a direction of torque flow. Further, the system includes only three speed sensors including one at the engine crankshaft, one at the transmission input shaft, and one at the transmission output shaft.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 12 may initiate engine shutdown by shutting off fuel and/or spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

Thus, the system of FIGS. 1 and 2 provides for a vehicle system, comprising: an engine; a transmission including a torque converter having a torque converter clutch; a disconnect clutch positioned between the engine and the torque converter; and a controller including instructions stored in a non-transitory memory for accelerating the engine to a speed of an output side of the disconnect clutch when the disconnect clutch is open, the speed of the output side of the disconnect clutch determined based on a transmission shaft input speed. The vehicle system further comprises additional instructions for opening the disconnect clutch in response to a request to stop engine rotation. The vehicle system further comprises additional instructions to at least partially close the torque converter clutch in response to the request to stop engine rotation. The vehicle system includes where the disconnect clutch is not opened until the torque converter clutch is at least partially closed to provide a threshold torque transfer capacity across the torque converter. The vehicle system further comprises additional instructions to shift the transmission to maintain output of a pump to a level greater than a predetermined threshold. The vehicle system further comprises additional instructions to reduce output capacity of the pump when the disconnect clutch is open and a vehicle in which the engine operates is moving.

Figure 3:
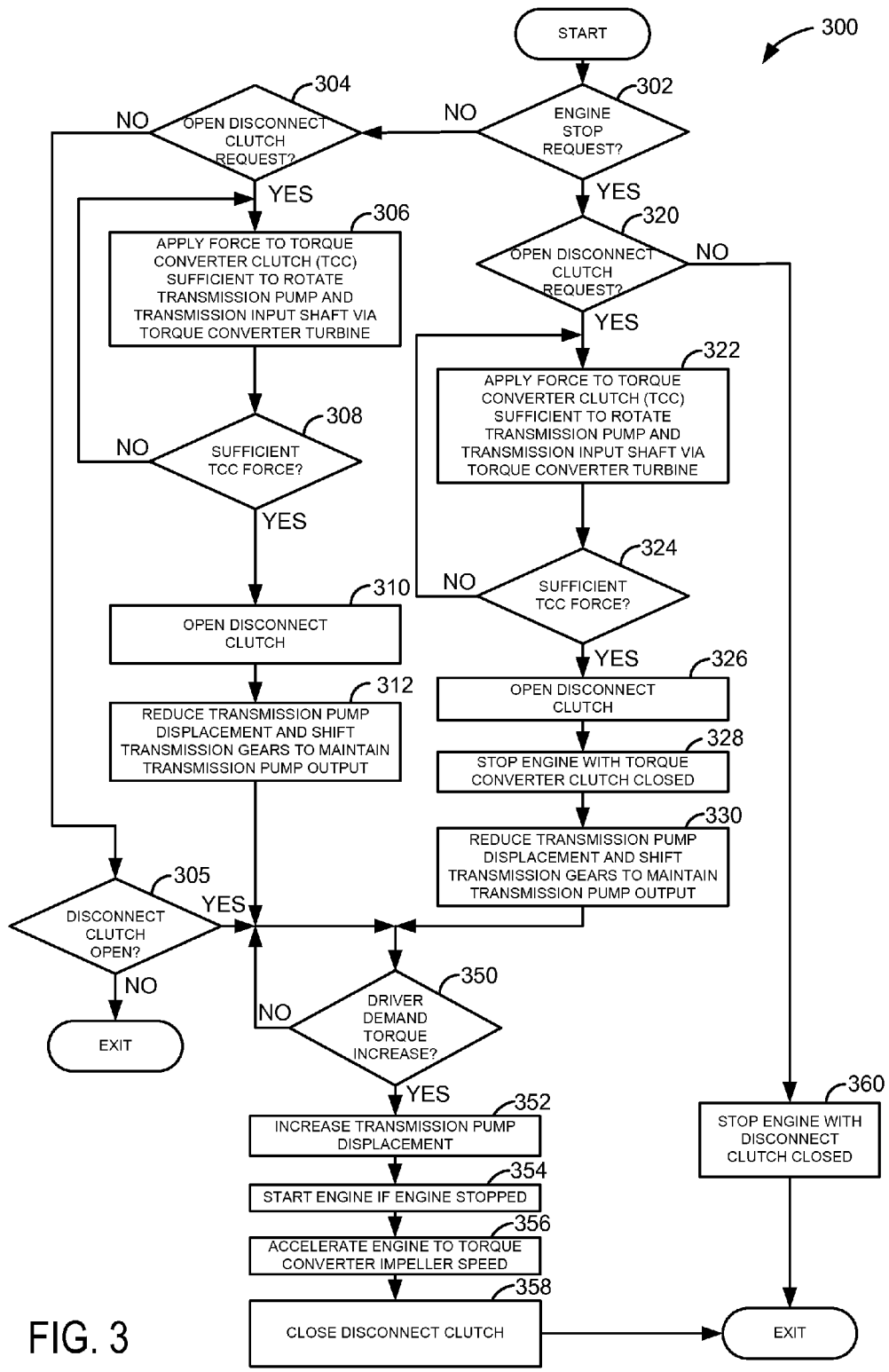
FIG. 3 shows a flowchart of an example method for operating the driveline.
Figure 4:
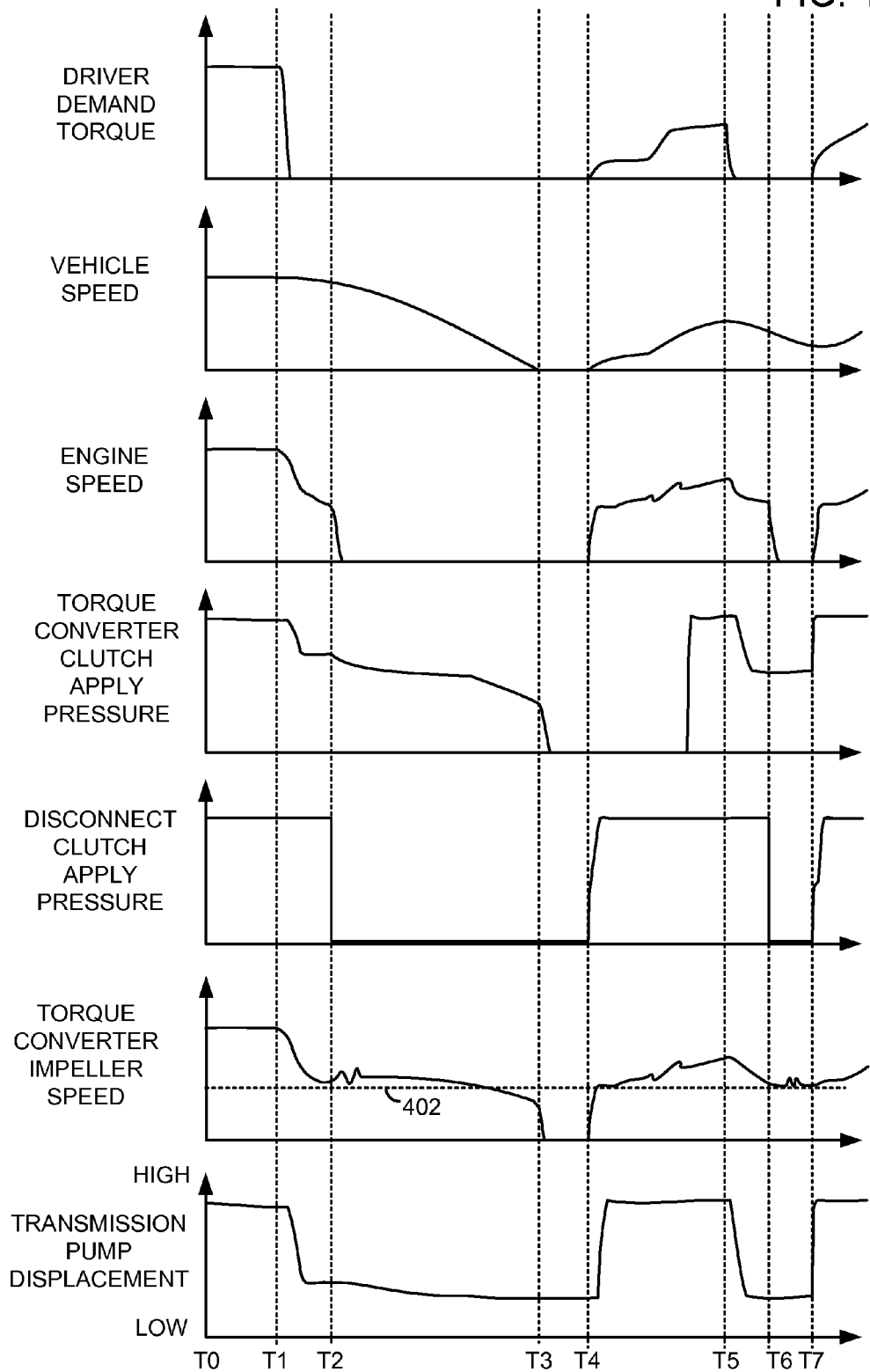
FIG. 4 shows an example driveline operating sequence according to the method of FIG. 3.

Referring now to FIG. 3, a method for operating a vehicle driveline is shown. The method of FIG. 3 may be incorporated into the system of FIGS. 1 and 2 as executable instructions stored in non-transitory memory. Further, the method of FIG. 3 may provide the operating sequence as is shown in FIG. 4.

At 302, method 300 judges whether or not there is a request to stop the vehicle's engine. A request for engine stop may be initiated in response to low driver demand torque (e.g., accelerator pedal not being applied). In other examples, the engine stop request may be initiated in response to low driver demand torque and the brake pedal being applied. The engine may be stopped from rotating at low driver demand torques to conserve fuel. If method 300 judges that an engine stop request is not present, the answer is no and method 300 proceeds to 304. Otherwise, the answer is yes and method 300 proceeds to 320.

At 304, method 300 judges whether or not there is a request to open the driveline disconnect clutch. A request to open the driveline disconnect clutch may be made in response to engine speed being less than a threshold speed after spark and fuel cease to be supplied to the engine in response to the requested engine stop. The request to open the driveline disconnect clutch may also be made in response to other operating conditions, such as in response to a low driver demand torque. If method 300 judges that a disconnect clutch open request is not present, the answer is no and method 300 proceeds to 305. Otherwise, the answer is yes and method 300 proceeds to 306.

At 305, method 300 judges whether or not the driveline disconnect clutch is open. The driveline disconnect clutch may be determined opened based on output of a position sensor or based on pressure of fluid supplied to open or close the disconnect clutch. If method 300 judges that a disconnect clutch is open, the answer is yes and method 300 proceeds to 350. Otherwise, the answer is no and method 300 proceeds to exit.

At 306, method 300 at least partially closes the torque converter clutch. In one example, force supplied to close the torque converter clutch is sufficient to rotate only the output side of the disconnect clutch, the transmission pump, and the torque converter impeller at a same speed as the torque converter turbine. Thus, the force applied to the torque converter clutch adjusts the torque converter clutch's torque capacity to rotate only the output side of the disconnect clutch, the transmission pump, and the torque converter impeller via the torque converter turbine. The torque capacity of the torque converter clutch is insufficient to rotate the input side of the disconnect clutch, the output side of the disconnect clutch, the transmission pump, and the torque converter impeller at a same speed as the torque converter turbine and transmission input shaft. The force applied to the torque converter clutch is less than a threshold force to rotate the input side of the disconnect clutch, the output side of the disconnect clutch, the transmission pump, and the torque converter impeller at a same speed as the torque converter turbine and transmission input shaft via the torque converter turbine. By limiting the torque capacity of the torque converter clutch, it may be possible to operate the torque converter clutch with lower transmission fluid pressures. Further, parasitic transmission losses may be reduced when the transmission pump is operated at lower pressures to apply the torque converter clutch. The torque converter application force may be adjusted by changing pressure of fluid supplied to operate the torque converter clutch. Method 300 proceeds to 308 after adjusting the torque converter application force.

At 308, method 300 judges whether or not the application force applied to the torque converter clutch (TCC) is sufficient to provide torque transfer capacity across the torque converter clutch sufficient to rotate only the output side of the disconnect clutch, the transmission pump, and the torque converter impeller at a same speed as the torque converter turbine and transmission input shaft via torque converter turbine rotation. If method 300 judges that the application force applied to the torque converter clutch (TCC) is sufficient to provide torque transfer capacity across the torque converter clutch sufficient to rotate the output side of the disconnect clutch, the transmission pump, and the torque converter impeller at a same speed as the torque converter turbine and transmission input shaft, the answer is yes and method 300 proceeds to 310. Otherwise, the answer is no and method 300 returns to 306 until the application force applied to the torque converter clutch (TCC) is sufficient to provide torque transfer capacity across the torque converter clutch sufficient to rotate the output side of the disconnect clutch, the transmission pump, and the torque converter impeller at a same speed as the torque converter turbine and transmission input shaft.

At 310, method 300 opens the disconnect clutch. The disconnect clutch may be fully opened so that substantially no torque (e.g., less than 10 Nm) is transferred between the engine and the torque converter. Method 300 proceeds to 312 after the disconnect clutch is opened.

At 312, method 300 reduces displacement of the transmission pump. In one example, transmission pump displacement may be reduced via decreasing lift of a cam or adjusting a position of a flow control solenoid. In one example, the transmission pump displacement is reduced to provide less than a threshold pressure at an outlet of the transmission pump. By reducing transmission pump outlet pressure, parasitic transmission losses may be reduced. In one example, the transmission output pressure is reduced to a level where the torque converter clutch torque capacity is sufficient to rotate only the output side of the disconnect clutch, the transmission pump, and the torque converter impeller at a same speed as the torque converter turbine and transmission input shaft.

Additionally, method 300 shifts transmission gears to maintain output pressure of transmission pump to greater than a threshold level. The threshold output pressure may be provided when torque converter impeller speed is greater than a threshold speed. Consequently, the transmission may be shifted as the vehicle moves to maintain transmission pump speed and transmission output pressure above threshold levels. For example, if the vehicle is decelerating, the transmission may be downshifted as torque converter impeller speed approaches a threshold speed where pump output is a threshold level. Downshifting the transmission increases torque converter turbine speed, pump speed, and torque converter impeller speed since the torque converter clutch is closed. Method 300 proceeds to 350 after the transmission pump displacement is reduced.

At 350, method 300 judges if driver demand torque is increasing. Additionally, or alternatively, method 300 may judge if other engine starting conditions are present. For example, method 300 may judge if catalyst temperature is less than a threshold or if engine temperature is less than a threshold. Further, method 300 may judge if vacuum stored on board the vehicle is less than a threshold. If one or more conditions are present, the answer is yes and method 300 proceeds to 352. Otherwise, the answer is no and method 300 returns to 350.

At 352, method 300 increases displacement of the transmission pump. In one example, transmission pump displacement may be increased via increasing lift of a cam or adjusting a position of a flow control solenoid. In one example, the transmission pump displacement is increased to provide more than a threshold pressure at an outlet of the transmission pump. By increasing transmission pump outlet pressure, the torque capacity of the disconnect clutch and/or torque converter clutch may be increased. In one example, the transmission output pressure is increased to a level where the torque converter clutch torque capacity is sufficient to rotate the disconnect clutch input side, the disconnect clutch output side, the transmission pump, and the torque converter impeller at a same speed as the torque converter turbine and transmission input shaft. Thus, the torque converter clutch capacity may also be increased at 352. Method 300 proceeds to 354 after the transmission pump displacement is increased.

At 354, method 300 starts the engine if the engine is not rotating. The engine may be started via a starter that engages the engine crankshaft via a flywheel. The starter rotates the engine and spark and fuel are supplied to engine cylinders. Method 300 proceeds to 356 after the engine is started.

At 356, method 300 accelerates the engine to a speed of the output side of the driveline disconnect clutch. The driveline disconnect clutch speed is not monitored by a speed sensor. Instead, the output side of the driveline disconnect clutch is determined to be at a same speed as transmission input shaft speed since the torque converter clutch is closed. The engine is accelerated to the speed of the output side of the disconnect clutch via increasing air flow and fuel flow to engine cylinders. In this way, the output speed of the disconnect clutch may be a target or desired engine speed. Method 300 proceeds to 358 after the engine is accelerated to the speed of the driveline disconnect clutch.

At 358, method 300 closes the disconnect clutch. The disconnect clutch may be closed by increasing pressure of oil supplied to the disconnect clutch. Additionally, the torque converter clutch may be at least partially opened as the disconnect clutch is closed to dampen driveline torque pulsations. Method 300 proceeds to exit after the disconnect clutch is closed. At 320, method 300 judges whether or not there is a request to open the driveline disconnect clutch. A request to open the driveline disconnect clutch may be made in response to engine speed being less than a threshold speed after spark and fuel cease to be supplied to the engine in response to the requested engine stop. The request to open the driveline disconnect clutch may also be made in response to other operating conditions, such as in response to a low driver demand torque. If method 300 judges that a disconnect clutch open is not present, the answer is no and method 300 proceeds to 360. Otherwise, the answer is yes and method 300 proceeds to 322.

At 322, method 300 at least partially closes the torque converter clutch. In one example, force supplied to close the torque converter clutch is sufficient to rotate only the output side of the disconnect clutch, the transmission pump, and the torque converter impeller at a same speed as the torque converter turbine. Thus, the force applied to the torque converter clutch adjusts the torque converter clutch's torque capacity to allow rotation of only the output side of the disconnect clutch, the transmission pump, and the torque converter impeller via the torque converter turbine. The torque capacity of the torque converter clutch is insufficient to rotate the input side of the disconnect clutch, the output side of the disconnect clutch, the transmission pump, and the torque converter impeller at a same speed (e.g., no slip) as the torque converter turbine and transmission input shaft. The force applied to the torque converter clutch is less than a threshold force to rotate the input side of the disconnect clutch, the output side of the disconnect clutch, the transmission pump, and the torque converter impeller at a same speed as the torque converter turbine and transmission input shaft via the torque converter turbine. By limiting the torque capacity of the torque converter clutch, it may be possible to operate the torque converter clutch with lower transmission fluid pressures. Further, parasitic transmission losses may be reduced when the transmission pump is operated at lower pressures to apply the torque converter clutch. The torque converter application force may be adjusted by changing pressure of fluid supplied to operate the torque converter clutch. Method 300 proceeds to 324 after adjusting the torque converter application force.

At 324, method 300 judges whether or not the application force applied to the torque converter clutch (TCC) is sufficient to provide torque transfer capacity across the torque converter clutch sufficient to rotate only the output side of the disconnect clutch, the transmission pump, and the torque converter impeller at a same speed as the torque converter turbine and transmission input shaft via torque converter turbine rotation. If method 300 judges that the application force applied to the torque converter clutch (TCC) is sufficient to provide torque transfer capacity across the torque converter clutch sufficient to rotate the output side of the disconnect clutch, the transmission pump, and the torque converter impeller at a same speed as the torque converter turbine and transmission input shaft, the answer is yes and method 300 proceeds to 326. Otherwise, the answer is no and method 300 returns to 322 until the application force applied to the torque converter clutch (TCC) is sufficient to provide torque transfer capacity across the torque converter clutch sufficient to rotate the output side of the disconnect clutch, the transmission pump, and the torque converter impeller at a same speed as the torque converter turbine and transmission input shaft.

At 326, method 300 opens the disconnect clutch. The disconnect clutch may be fully opened so that substantially no torque (e.g., less than 10 Nm) is transferred between the engine and the torque converter. Method 300 proceeds to 328 after the disconnect clutch is opened.

At 328, method 300 stops the engine while the torque converter clutch is closed and the driveline disconnect clutch is open. The engine rotation is stopped by ceasing to supply spark and fuel to engine cylinders. By holding the torque converter clutch closed, the transmission pump may continue to pump transmission fluid even though the engine is not rotating. On the other hand, if the engine was stopped and the torque converter clutch was open, there would be no torque to drive the transmission pump. Wheel torque drives the transmission pump when the torque converter clutch is closed.

At 330, method 300 reduces displacement of the transmission pump. In one example, transmission pump displacement may be reduced via decreasing lift of a cam or adjusting a position of a flow control solenoid. In one example, the transmission pump displacement is reduced to provide less than a threshold pressure at an outlet of the transmission pump. By reducing transmission pump outlet pressure, parasitic transmission losses may be reduced. In one example, the transmission output pressure is reduced to a level where the torque converter clutch torque capacity is sufficient to rotate only the output side of the disconnect clutch, the transmission pump, and the torque converter impeller at a same speed as the torque converter turbine and transmission input shaft.

Additionally, method 300 shifts transmission gears to maintain output pressure of transmission pump to greater than a threshold level. The threshold output pressure may be provided when transmission speed is greater than a threshold speed. Consequently, the transmission may be shifted as the vehicle moves to maintain transmission pump speed and transmission output pressure above threshold levels. For example, if the vehicle is decelerating, the transmission may be downshifted as torque converter impeller speed approaches a threshold speed where pump output is a threshold level. Downshifting the transmission increases torque converter turbine speed, pump speed, and torque converter impeller speed since the torque converter clutch is closed. Method 300 proceeds to 350 after the transmission pump displacement is reduced.

At 360, method 300 stops engine rotation via ceasing to supply spark and fuel to engine cylinders. In one example, the engine may be stopped with the disconnect clutch closed in response to an operator requested engine stop. Alternatively, the engine may be stopped with the disconnect clutch closed when an engine stop request is received and the vehicle is not moving.

In this way, method 300 may operate a torque converter clutch to improve operation of a driveline disconnect clutch. In particular, driveline disconnect clutch operation may be improved by producing less slip across the driveline disconnect clutch after the engine is started and recoupled to the driveline. Further, since engine speed may be more closely driven toward disconnect clutch output side speed, fewer driveline torque disturbances with less amplitude may be transmitted through the driveline.

Referring now to FIG. 4, an example vehicle driveline operating sequence is shown. The signals and sequences of FIG. 4 may be provided by the system shown in FIGS. 1 and 2 executing the method of FIG. 3. Vertical markers T0-T7 represent times of interest in the sequence. In this example, two engine stopping events are shown. The first engine stopping event occurs between times T0 and T3. It represents an engine stopping event where the engine is not restarted until after the vehicle is stopped. The second engine stopping event occurs between times T5 and T7. It represents an engine stopping event where the engine is restarted before the vehicle comes to a stop.

The first plot from the top of FIG. 4 represents driver demand torque versus time. The horizontal axis represents time and time increases from the left side of the plot to the right side of the plot. The vertical axis represents driver demand torque and driver demand torque increases in the direction of the vertical axis arrow. Driver demand torque may be determined from accelerator pedal position and vehicle speed.

The second plot from the top of FIG. 4 represents vehicle speed versus time. The vertical axis represents vehicle speed and vehicle speed increases in the direction of the vertical axis arrow. Vehicle speed is zero at the horizontal axis. The horizontal axis represents time and time increases from the left side of the plot to the right side of the plot.

The third plot from the top of FIG. 4 represents engine speed versus time. The vertical axis represents engine speed and engine speed increases in the direction of the vertical axis arrow. The horizontal axis represents time and time increases from the left to the right side of the figure.

The fourth plot from the top of FIG. 4 represents torque converter clutch apply pressure (e.g., pressure to close the torque converter clutch and it is related to torque converter clutch torque transfer capacity across the torque converter clutch) versus time. The vertical axis represents torque converter application pressure and application pressure increases in the direction of the vertical axis arrow. The horizontal axis represents time and time increases from the left to the right side of the figure.

The fifth plot from the top of FIG. 4 represents disconnect clutch apply pressure (e.g., pressure to close the disconnect clutch and it is related to disconnect clutch torque transfer capacity across the disconnect clutch) versus time. The vertical axis represents disconnect clutch application pressure and application pressure increases in the direction of the vertical axis arrow. The horizontal axis represents time and time increases from the left to the right side of the figure.

The sixth plot from the top of FIG. 4 represents torque converter impeller speed versus time. The vertical axis represents torque converter impeller speed and torque converter impeller speed increases in the direction of the vertical axis arrow. The horizontal axis represents time and time increases from the left to the right side of the figure. Horizontal line 402 represents a minimum torque converter impeller speed for the transmission pump to supply a threshold pressure.

The seventh plot from the top of FIG. 4 represents transmission fluid pump displacement versus time. The vertical axis represents transmission pump displacement and transmission pump displacement increases in the direction of the vertical axis arrow. The horizontal axis represents time and time increases from the left to the right side of the figure.

At time T0, the driver demand torque is at a higher level and the vehicle speed is also at a higher level. Further, the engine speed is elevated and the torque converter apply pressure it at a higher level. The disconnect clutch is closed so that the engine is coupled to the torque converter impeller and the torque converter impeller speed is equal to engine speed. The disconnect clutch closes at higher application pressures and opens at lower application pressures. The transmission pump displacement is at a higher level where its pumping capacity is higher.

At time T1, a driver reduces the driver demand torque and it move toward zero. The vehicle speed begins to decrease in response to the reduced driver demand torque since engine torque (not shown) is reduced based on the driver demand torque. The engine seed also decreases in response to the reduced driver demand torque. The torque converter clutch application pressure and the transmission pump displacement are also reduced in response to the reduced driver demand torque. The torque converter impeller speed decreases with engine speed since the disconnect clutch is closed and the torque converter clutch application pressure is high.

Between time T1 and time T2, the engine speed, vehicle speed, torque converter impeller speed, transmission pump displacement, and disconnect clutch application pressure continue to decrease in response to the low driver demand torque.

At time T2, the disconnect clutch is opened. The disconnect clutch may be opened responsive to engine speed being less than a threshold speed and driver demand torque being less than a threshold torque. Further, the disconnect clutch may be opened in response to low driver demand torque and a threshold vehicle speed or other conditions. The torque converter application pressure remains at an elevated pressure so that the torque converter clutch is mechanically couples the torque converter impeller to the torque converter turbine.

Between time T2 and time T3, the driver demand torque remains at zero and the vehicle speed continues to decline. The engine stops rotating and the torque converter application pressure remains elevated to mechanically couple the torque converter turbine to the torque converter impeller which drives the transmission pump. The disconnect clutch remains open and the torque converter impeller speed increases several times as the transmission is downshifted to maintain transmission pump outlet pressure and torque converter speed greater than level 402. The transmission pump displacement remains at a reduced level.

At time T3, the vehicle reaches zero speed and the engine is stopped. The driver demand torque remains zero and the torque converter application pressure is reduced as the transmission pump speed approaches zero. The transmission pump displacement remains at a lower level.

At time T4, the driver demand torque increases in response to the driver applying the accelerator pedal (not shown). The engine is started and the driveline disconnect clutch is closed via increasing the disconnect clutch application force. The torque converter clutch is open since the torque converter clutch application pressure is zero. The vehicle speed begins to increase and the torque converter impeller speed increases with engine speed since the disconnect clutch is closed.

Between time T4 and time T5, the driver demand torque increases and the vehicle speed and engine speed increase in response to the increased driver demand torque. Further, the torque converter impeller speed increases with engine speed and the engine speed and torque converter speed decrease in response to upshifting a transmission (not shown). The transmission pump displacement is increased after the engine is started and the disconnect clutch application pressure is at a higher level to close the driveline disconnect clutch. The torque converter application pressure or force is increased near time T5 to lock (e.g., fully close) the torque converter clutch.

At time T5, the driver demand torque decreases in response to the driver releasing the accelerator pedal (not shown). The engine speed and torque converter clutch application pressure are decreased in response to the decreased driver demand torque. Additionally, the transmission pump displacement is reduced in response to the decrease in driver demand torque. The torque converter impeller speed is reduced with engine speed since the drive line disconnect clutch is closed. The vehicle speed begins to decrease in response to the decreased driver demand torque.

At time T6, the driveline disconnect clutch is opened in response to the low driver demand torque. The engine stops rotating shortly thereafter, and the vehicle speed continues to decrease. The torque converter application pressure is reduced and the torque converter impeller speed is reduced as vehicle speed is reduced since the torque converter impeller and turbine are mechanically coupled to the vehicle wheels. The transmission pump displacement is also reduced in response to opening the driveline disconnect clutch. Reducing the pump displacement may increase the vehicle's coasting distance and reduce transmission parasitic losses.

Between time T6 and time T7, the transmission is downshifted to maintain torque converter impeller speed above threshold 402. The vehicle speed continues to decrease and driver demand torque is zero.

At time T7, the driver demand torque is increased before vehicle speed is zero. The engine is started in response to the increase in driver demand torque and the engine is accelerated to the torque converter impeller speed which is determined via transmission input shaft speed since the torque converter clutch remains in a closed state via the higher torque converter application pressure. The disconnect clutch application pressure fully closes the driveline disconnect clutch when engine speed is within a threshold speed of torque converter impeller speed. The transmission pump displacement is also increased in response to the increase in driver demand torque. The vehicle speed increases with increased driver demand torque after the engine is started.

In this way, the torque converter clutch may be controlled to adjust torque converter impeller speed and driveline disconnect clutch output to transmission input shaft speed so that engine speed may be adjusted to driveline disconnect clutch output speed before the driveline disconnect clutch is closed. Such operation may reduce disconnect clutch wear and driveline torque disturbances.

Thus, the method of FIG. 4 provides for a method for operating a driveline, comprising: at least partially closing a torque converter clutch in response to a request to open a disconnect clutch, the torque converter clutch at least partially closed before opening the disconnect clutch; and accelerating an engine that has stopped rotating to a speed based on disconnect clutch output side speed. The method further comprises estimating the disconnect clutch output side speed based on speed of a transmission input shaft, the transmission input shaft downstream of a torque converter and the engine in a driveline torque path. The method further comprises shifting gears of a transmission to maintain torque converter impeller speed greater than a threshold speed while the disconnect clutch is open.

In some examples, the method further comprises reducing a pumping volume of a transmission pump in response to the disconnect clutch being open. The method includes where the engine is accelerated via combustion in the engine and where the engine is accelerated in response to an increase in driver demand torque. The method further comprises increasing the pumping volume of the transmission pump in response to the increased driver demand torque. The method includes where an application force applied to close the torque converter is only sufficient to rotate a transmission pump, an output side of the disconnect clutch, the torque converter impeller via the torque converter turbine, and a predetermined offset torque.

The method of FIG. 3 also provide for a method for operating a driveline, comprising: not opening a disconnect clutch in response to a request to open the disconnect clutch until a torque converter clutch has at least partially closed to provide more than a threshold amount of torque transfer capacity across the torque converter clutch. The method includes where the threshold amount of torque transfer capacity is an amount of torque to rotate an output side of a disconnect clutch, a transmission pump, and a torque converter impeller, but not sufficient to rotate an engine or input side of the disconnect clutch. The method includes where the driveline disconnect clutch is positioned between an engine and a torque converter, and where the engine is a sole adjustable torque source in the driveline.

In some examples, the method further comprises opening the driveline disconnect clutch when the torque converter clutch has a torque transfer capacity greater than the threshold amount of torque capacity across the torque converter clutch. The method further comprises closing the driveline disconnect clutch in response to an increase in driver demand torque. The method further comprises reducing output of a transmission pump in response to the torque converter clutch having a torque transfer capacity greater than the threshold amount of torque capacity across the torque converter clutch. The method further comprises shifting a transmission to maintain output of a transmission pump while the disconnect clutch is open, the transmission not coupled to an adjustable torque source during the shifting.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating a driveline, comprising:
at least partially closing a torque converter clutch in response to a request to open a disconnect clutch, the torque converter clutch at least partially closed before opening the disconnect clutch; and
accelerating an engine that has stopped rotating to a speed based on disconnect clutch output side speed.

2. The method of claim 1, further comprising estimating the disconnect clutch output side speed based on speed of a transmission input shaft, the transmission input shaft downstream of a torque converter and the engine in a driveline torque path.

3. The method of claim 1, further comprising shifting gears of a transmission to maintain torque converter impeller speed greater than a threshold speed while the disconnect clutch is open.

4. The method of claim 1, further comprising reducing a pumping volume of a transmission pump in response to the disconnect clutch being open.

5. The method of claim 4, where the engine is accelerated via combustion in the engine and where the engine is accelerated in response to an increase in driver demand torque.

6. The method of claim 5, further comprising increasing the pumping volume of the transmission pump in response to the increased driver demand torque.

7. The method of claim 1, where an application force applied to close the torque converter is only sufficient to rotate a transmission pump, an output side of the disconnect clutch, the torque converter impeller via the torque converter turbine, and a predetermined offset torque.

8. A method for operating a driveline, comprising:
not opening a disconnect clutch in response to a request to open the disconnect clutch until a torque converter clutch has at least partially closed to provide more than a threshold amount of torque transfer capacity across the torque converter clutch.

9. The method of claim 8, where the threshold amount of torque transfer capacity is an amount of torque to rotate an output side of a disconnect clutch, a transmission pump, and a torque converter impeller.

10. The method of claim 8, where the driveline disconnect clutch is positioned between an engine and a torque converter, and where the engine is a sole adjustable torque source in the driveline.

11. The method of claim 8, further comprising opening the driveline disconnect clutch when the torque converter clutch has a torque transfer capacity greater than the threshold amount of torque capacity across the torque converter clutch.

12. The method of claim 11, further comprising closing the driveline disconnect clutch in response to an increase in driver demand torque.

13. The method of claim 11, further comprising reducing output of a transmission pump in response to the torque converter clutch having a torque transfer capacity greater than the threshold amount of torque capacity across the torque converter clutch.

14. The method of claim 8, further comprising shifting a transmission to maintain output of a transmission pump while the disconnect clutch is open, the transmission not coupled to an adjustable torque source during the shifting.

15. A vehicle system, comprising:
an engine;
a transmission including a torque converter having a torque converter clutch;
a disconnect clutch positioned between the engine and the torque converter; and
a controller including instructions stored in a non-transitory memory for accelerating the engine to a speed of an output side of the disconnect clutch when the disconnect clutch is open, the speed of the output side of the disconnect clutch determined based on a transmission shaft input speed.

16. The vehicle system of claim 15, further comprising additional instructions for opening the disconnect clutch in response to a request to stop engine rotation.

17. The vehicle system of claim 16, further comprising additional instructions to at least partially close the torque converter clutch in response to the request to stop engine rotation.

18. The vehicle system of claim 17, where the disconnect clutch is not opened until the torque converter clutch is at least partially closed to provide a threshold torque transfer capacity across the torque converter.

19. The vehicle system of claim 15, further comprising additional instructions to shift the transmission to maintain output of a pump to a level greater than a predetermined threshold.

20. The vehicle system of claim 19, further comprising additional instructions to reduce output capacity of the pump when the disconnect clutch is open and a vehicle in which the engine operates is moving.

* * * * *